United States Patent [19]

Sturwold et al.

[11] 3,915,872

[45] Oct. 28, 1975

[54] CONVERSION OF DISTILLATION RESIDUES TO USEFUL METAL WORKING LUBRICANTS

[75] Inventors: Robert J. Sturwold; Fred O. Barrett; Walter E. Utz, all of Cincinnati, Ohio

[73] Assignee: Emery Industries, Inc., Cincinnati, Ohio

[22] Filed: Oct. 1, 1974

[21] Appl. No.: 511,065

Related U.S. Application Data

[63] Continuation-in-part of Ser. No. 495,620, Aug. 8, 1974.

[52] U.S. Cl. ............... 252/49.3; 72/42; 252/49.3; 252/52 A; 252/56 R; 252/56 S; 252/56 D
[51] Int. Cl.². C10M 1/06; C10M 3/04; C10M 5/04; C10M 7/08
[58] Field of Search ............ 72/42; 252/49.3, 52 A, 252/56 R, 56 S, 56 D

[56] References Cited
UNITED STATES PATENTS

| 3,374,171 | 3/1968 | Darr's | 252/49.3 |
| 3,492,232 | 1/1970 | Rosenberg | 252/49.3 |
| 3,630,898 | 12/1971 | Teeter et al. | 252/49.3 |
| 3,740,352 | 6/1973 | Sommers | 252/49.3 |
| 3,752,766 | 8/1973 | Wilson | 252/52 A |
| 3,791,971 | 2/1974 | Lowe | 252/52 A |
| 3,847,828 | 11/1974 | Latos | 252/49.3 |

*Primary Examiner*—Delbert E. Gantz
*Assistant Examiner*—I. Vaughn
*Attorney, Agent, or Firm*—Baracka, Gerald A.; John D. Rice

[57] ABSTRACT

Residues resulting from the distillation of fatty acids obtained from fat-splitting processes are converted by the process of this invention to useful metal working lubricants. The present process utilizes distillation residues, which are typically viscous oils ranging in color from dark brown to black and which heretofore had little or no commercial value and were burned or otherwise disposed of, to produce lubricants having performance characteristics which make them suitable for use in continuous metal-casting and other metal working operations.

9 Claims, No Drawings

CONVERSION OF DISTILLATION RESIDUES TO USEFUL METAL WORKING LUBRICANTS

CROSS-REFERENCE

This is a continuation-in-part of copending application Ser. No. 495,620 filed Aug. 8, 1974.

BACKGROUND OF THE INVENTION

The present invention is directed to a process for converting waste residues obtained from the distillation of fatty acids produced in fat-splitting operations wherein fats and fatty oils are hydrolyzed into fatty acids and glycerol by subjecting the fatty materials to high temperatures and pressures in the presence of water. Fat-splitting procesess are well-known and widely used industrially to obtain fatty acids and glycerine.

The fatty acids obtained from such splitting operations, in addition to being gross mixtures containing numerous fatty acids, typically have poor color and odor due to the presence of a variety of impurities resulting from the severe processing conditions and impurities in the fatty material being treated. In view of this, it is customary to distill the resulting fatty acid mixtures for purification purposes and/or to separate the various fatty acid components. This is accomplished using conventional distillation equipment and procedures. At the completion of the distillation there is a residue consisting primarily of oxidative and polymeric by-products including color bodies, odor bodies, modified glycerides and unhydrolyzed or partially hydrolyzed fatty materials. This residue, in some instances is subjected to further pressure splitting, however, even when one or more additional splitting steps are employed a final distillation residue will still be obtained.

These oily malodorous distillation residues are highly colored, ranging in color from deep brown to totally black. In the past, it has been the usual practice in industrial operations to dispose of these residues by burning, burying, etc., but because of their low fuel value and for ecological reasons this is becoming increasingly more difficult and costly. These residues have also been suggested for use as extenders in tar products but there is limited use in this area.

SUMMARY OF THE INVENTION

We have now discovered a process whereby waste distillation residues are converted to useful metal working lubricants. The process involves reacting the residue with a hydroxylic compound containing at least one hydroxyl group and at least 4 carbon atoms at a temperature above 100°C, preferably between 150° and 250°C, while removing water from the reaction mixture. The equivalents ratio of the hydroxylic compound to the residue will be 1:1 or higher, based on the acid value of the residue. Residues employed are obtained when fatty acids produced in fat-splitting processes are distilled and typically are brown to black liquids having 180°F kinematic viscosities in the range 40–300 centistokes with iodine values from about 50 to 100, acid values between about 50 and 100 and saponification values between about 100 and 200. Hydroxylic compounds useful in the process are aliphatic, cycloaliphatic and aromatic and mono-, di- and polyhydric alcohols containing 6 to 20 carbon atoms and polyoxyalkylene glycols having molecular weights from about 100 to 4000. The products of this invention may be used as such or filtered with diatomaceous earth. While these products may vary in composition and lubrication properties they preferably have flash points of about 500°C and fire points greater than 540°C. The products of this invention are useful in a variety of lubrication applications, however, they find particular utility as lubricants for the continuous casting of metals such as steel or steel alloys.

In a preferred embodiment of this invention where polyoxyethylene glycols of molecular weight 100–4000, and more preferably 400–2000, are reacted with the residue, an acid or acid derivative such as an acid anhydride or lower alkyl ester of the acid is included in the reaction. In this way it is possible to obtain lubricants which form homogeneous solutions with water in all proportions. These lubricants typically contain 60–90% (by weight) polyoxyethylene glycol, 7–18% of acid and 3–26% the distillation residue but more preferably contain 65–80%, 11–15% and 5–25% of the respective components.

DETAILED DESCRIPTION

This invention provides a process for converting waste residues resulting from the distillation of certain fatty acids to useful products, namely, metal working lubricants. The distillation residues employed herein result from fat-splitting processes wherein fats and fatty oils are hydrolyzed into fatty acids and glycerol at high temperatures and pressures in the presence of water. The so-produced fatty acids upon distillation yield the waste residue.

The manner in which the fat-splitting process and fatty acid distillation are conducted does not form a part of this invention but serve only as a source for the material to be processed. In other words, the present process is useful with any distillation residue without regard to the conditions employed during the fat-splitting operation and subsequent distillation. Known fat-splitting procedures, such as those described in U.S. Pat. No. 2,156,863 and Reissue 22,006, and various modifications thereof used by industry can be employed. A typical industrial fat-splitting operation, for example, involves countercurrent contact of fat and water in a column. This is accomplished by introducing the fatty material into the column under high pressure through a sparge ring which breaks the fat into small droplets. As the fat droplets are heated they pass upward through the column where the temperature is increased by the introduction of steam under high pressure. Water is charged under pressure through a sparge ring at the top of the column. The rate of flow of fat and water are carefully controlled to permit maximum contact with each other. The column is completely filled with liquids and vaporization of water is prevented by maintaining the pressure within the system in excess of the vapor pressure of water at the operating temperature. Generally, the pressure will range between about 150 and 1600 psi while maintaining a temperature of at least 350°F and, more preferably, between 365°F and 600°F. Sweet water (aqueous glycerine) is collected at the bottom of the column and pumped to a glycerine concentrator. Fatty acids are discharged from the top of the tower.

Fatty acids originating from the fat-splitting operation are highly colored and contain a variety of impurities. It is customary therefore to distill the fatty acids either solely for the purposse of purification or additionally to separate the various acids of different chain lengths and boiling points. The distillation can be conducted either as a batch process or continuously. Continuous distillation is preferred since losses are minimized and it is possible to increase yield and quality of the distilled products and decrease the time exposure of the acids to high temperatures. Typically, a continuous commercial fatty acid distillation process involves initially stripping the fatty acids to remove "light ends" and odor bodies and then pumping the bottoms from the stripper column into the main fractionation column fitted with a plurality of bubble-cap or other suitable trays. The residue (bottoms) of the main column may be used directly in the process of this invention or may be fed to another stripping tower wherein very high boiling fatty acids are removed and the residue remaining after this step used in this process. Still another alternative would be to subject either of the so-obtained residues to a second splitting and distillation operation, following the same general procedure as outlined above, and to convert the residue to useful metal working lubricants in accordance with the invention. By subjecting the residue to additional splitting it is possible to improve the yield of fatty acids and glycerine. It is not generally practical, however, to have more than two splitting operations in the treatment of fatty materials since only marginal improvements are possible after two splittings. In all cases, however, a residue will be obtained from the distillation of the fatty acids which quite unexpectedly is converted by the process of this invention to a useful metal working lubricant. Similarly, if a batch distillation procedure is employed the pot residue remaining after removal of the fatty acids can be utilized for the process of this invention.

Residues useful for the present process are those obtained by splitting any of the commonly employed materials followed by distillation in the above manner. Common fatty materials which are split to obtain fatty acids and glycerine include vegetable and animal oils, such as tallow and other related greases, coconut oil, soybean oil, corn oil, peanut oil, cottonseed oil and the like. In some instances it may be advantageous to hydrogenate the fatty material prior to splitting.

The waste distillation residues which are converted to useful lubricant products by this process are mixtures containing numerous oxidative and polymeric by-products including modified glycerides, unhydrolyzed and partially hydrolyzed fatty materials and color and odor bodies and the precise composition is difficult and, in most instances impossible, to completely define. While the chemical makeup will vary depending on the fatty material used, splitting conditions and distillation procedure, the residues are in all instances highly colored (dark brown – black) liquids having 180°F kinematic viscosities ranging from 40 to 300 centistokes. The residues typically have iodine values from about 50 to 100, acid values between 50 and 100 and saponification values from 100 to 200. While the content of unsaponafiable materials in the residue can range up to about 50% by weight it is more usually less than about 25%.

The above-described residues, which as such have little or no practical or commercial value, are converted to useful lubricants in accordance with the process of the invention by contacting with hydroxylic compounds at elevated temperatures until the desired acid value is obtained. The process is conducted at temperatures above 100°C in order that the water formed during the reaction can be removed from the system. Best results are obtained at temperatures between about 150° and 250°C and, more preferably, between about 180° and 230°C. It is not necessary that a catalyst be employed to promote the condensation, however, known esterification catalysts such as sulfuric acid, alkyl and aryl sulfonic acids such as p-toluene sulfonic acid, sodium acid sulfate, phosphoric acid, stannous oxalate, butyl tutanate, or the like can be used. Also, it is possible in carrying out the reaction to employ an organic diluent which is inert to the reaction conditions employed but which preferably will form an azeotrope with water. Xylene and toluene are suitable diluent/carriers for this purpose.

Hydroxylic compounds useful in the present process contain one or more free hydroxyl groups and at least four carbon atoms. Suitable hydroxylic compounds include the aliphatic, cycloaliphatic, aromatic and polyoxyether alcohols, including mono-, di and polyhydric alcohols and mixtures thereof. Especially useful hydroxylic compounds for this invention are aliphathic, cycloaliphatic and aromatic mono-, di and polyhydric alcohols containing 5 to 20 carbon atoms and polyoxyalkylene glycols having molecular weights from about 100 to 4000. Useful monohydric alcohols, include n-butyl alcohol, amyl alcohol, isoamyl alcohol, n-hexyl alcohol, 2-ethylbutyl alcohol n-octyl alcohol, 2-ethylhexyl alcohol, decyl alcohol, lauryl alcohol, oleyl alcohol, ethylene glycol mono-n-butyl ether, diethylene glycol mono-n-butyl ether, diethyleneglycol mono-2-ethylhexyl ether, propylene glycol mono-n-butyl ether dipropyleneglycol mono-methyl ether, dipropylene glycol mono-n-butyl ether, tripropylene glycol mono-methyl ether, tripropyleneglycol mono-isopropyl ether, cyclohexanol, benzyl alcohol, oxo alcohols, such as iso-octyl, isodecyl and tridecyl alcohols, and the like. Di- and polyhydric alcohols, including polyether alcohols, which can be used include 1,4-butanedoil, 1,5-pentanedoil, 1,6-hexanedoil, 1,8-octanedoil, 1,10-docanedoil, 1,4-cyclohexanedimethanol, glycerol, soritol, pentaerythritol, trimethylolethane, trimethylolpropane, diethyleneglycol, dipropyleneglycol, tripropyleneglycol and similar materials having higher degrees of polymerization such as polyethylene glycols (also referred to as polyoxyethylene glycols), polypropylene glycols, polybutylene glycols and poly(ethylene-propylene) glycols.

In carrying out the process, a stoichiometric amount (1:1 equivalents ratio) of hydroxylic compound based on the acid value of the residue can be used or the hydroxylic material can be present in excess. The only requirement as to the amount of mono-, di or polyhydric alcohol used for the process is that sufficient hydroxyl groups be present for reaction (to react with the acid groups) to obtain the desired acid value. As a practical matter when using the hydroxylic materials which are not readily removable from the reaction mixture at the end of the reaction, that is, having a boiling point above about 180°C at 1 mm Hg., the stoichiometry is strictly observed and no more than about 5% excess of the alcohol should be charged. With the lower boiling and more volatile alcohols (such as monohydric alcohols) where it is possible to readily strip the materials from the reaction mixture, an excess can be employed which helps drive the reaction to completion. Some unreacted alcohol may be present in the final product without unduly detracting from the desirable properties.

If excess mono-, di- or polyhydric alcohol is to be stripped from the product at the termination of the reaction, this is accomplished by heating while the pressure is lowered to about 1 mm Hg. While it is not necessary, it is often advantageous to filter the product at the termination of the reaction using diatomaceous earths (often referred to as diatomite or kieselguhr) obtained from natural deposits and comprised primarily of silica and alumina are suitable for this purpose. By such filtration it is possible to obtain more uniform and consistent products which are easily applied to metals.

Other variations in the process of this invention are possible as will be recognized by those skilled in the art. For example, it is possible to modify the lubricant properties, as well as other properties, of the resulting product by including other carboxylic compounds or anhydrides or esters thereof in the reaction. Mono-, di- and polybasic acids, such as saturated and unsaturated monobasic acids and saturated di- and tricarboxylic acid, are useful for this purpose. For example, aliphatic and aromatic acids which can be employed include valeric acid, caproic acid, caprylic acid, 2-ethylhexoic acid, pelargonic acid, lauric acid, palmitic acid, stearic acid, oleic acid, azelaic acid, sebacic acid, succinic acid, glutaric acid, brassylic acid, malonic acid, fumaric acid, aconitic acid and dimer and trimer acids containing 32 to 54 carbon atoms (the polymerization products of unsaturated monocarboxylic acid), benzoic acid and substituted benzoic acids, the phthalic acids and the like. The addition of dimer acid is particularly useful to enhance the lubricant properties of the product whereas with azelaic acid and sebacic acid the solubility characteristics can be markedly altered, particularly when the hydroxylic compound is polyoxyethylene glycol.

Expecially useful lubricants are obtained in accordance with this invention when the residue is reacted with a polyoxyethylene glycol and a carboxylic acid. The lubricant products are capable of being mixed with water in all proportions to provide homogenous solutions which are effective lubricants for metal working operations where typically aqueous lubricant emulsions are used. These lubricant solutions are superior to emulsions in that they do nor separate upon standing even for prolonged periods and therefor do not require costly and time consuming agitation prior to use. To obtain the water-soluble lubricant products, polyoxyethylene glycols having molecular weights from 100 to 4000 and more preferably, from about 400 to 2000 are employed with a carboxylic acid containing from 4 to 15 carbon atoms and, more preferably, 6 to 10 carbon atoms. Suitable carboxylic acid derivative such as anhydrides and lower ($C_1$-$C_4$) alkyl esters thereof may also be used and yeild useful lubricants. Carboxylic acids useful for this aspect of the invention include mono-, di-, tri and even higher carboxylic acids which can be aliphatic (branched-chain or straight-chain), cycloaliphatic or aromatic. Illustrative acids for this purpose include: butyric, isobutyric, valeric, isovaleric, caproic, enanthic, caprylic, 2-ethylhexoic, pelargonic, capric, undecanoic, lauric, myristic, palmitic, succinic, glutaric, adipic, pimelic, suberic, azelaic, sebacic, tricarballylic, benzoic, toluic, ethylbenzoic, t-butylbenzoic, o-pthalic, m-phthalic, p-phthalic, homophthalic, benzenetricarboxylic and the like. Additionally, the methyl, ethyl, propyl or butyl esters of the above-mentioned acids may also be employed using transesterification conditions and catalysts. Anhydrides such as phthalic anhydride and trimellitic anhydride can also be used to prepare these lubricants. The water soluble products will contain 60 to 90 weight percent polyoxyethylene glycol, 7 to 18 weight percent acid or acid derivative and 3 to 26 weight percent residue. Especially useful products are obtained when the lubricants contain 5 to 25 percent residue, 65 to 80 percent polyoxyethylene glycol and 11 to 15 percent carboxylic acid.

The products of this invention are characterized as having flash points greater than about 500°F and fire points greater than about 540°F. These products have lubricities, measured using the Falex Test Method (ASTM D 2670), comparable to soybean oil, crambe oil and rapeseed oil without having certain undesirable properties generally attributed to these natural oils.

The following Examples serve to illustrate the invention more fully, however, they are intended solely for the purpose of illustration and not as a limitation on the scope of the invention. In these examples all parts and percentages are given on a weight basis unless otherwise indicated. Viscosities are kinematic viscosities obtained in accordance with ASTM D 445-65. Acid values and hydroxyl values reported as mg KOH/gram are determined by ASTM D 1980-67 and ASTM D 1957-63, respectively.

EXAMPLE I

A glass reactor equipped with a stirrer, thermometer, nitrogen inlet and water trap topped with a cooled condenser was charged with 411 parts of the black waste residue obtained from the distillation of fatty acids produced from the pressure splitting of tallow. The residue had an acid value of about 75° and 180°F kinematic viscosity of 95. 89 parts 2-ethylhexanol (25% excess based on the equivalent weight of the distillation residue as determined from the acid value) were then added and the reaction mixture heated under an atmosphere of nitrogen with continuous stirring at about 220°C for approximately 4 hours during which time about 9 mls of water were removed. When the acid value of the reaction mixture was less than 10 a vacuum of about 1 torr was applied to remove any additional water of reaction and the excess 2-ethylhexanol. The resulting dark product had a viscosity of 26.2 centistokes at 180°F and other properties making it useful as a metal working lubricant.

EXAMPLE II

Using a procedure similar to that described in Example I, the residue obtained when a first fatty acid distillation residue is subjected to a second splitting operation and fractional distillation was reacted with benzyl alcohol. The residue has the following properties:

| | |
|---|---|
| Acid value | 80 |
| Saponification value | 164 |
| Iodine value | 76.9 |
| % Unsaponafiables | 5.6 |
| 180°F viscosity | 122 centistokes |

Benzyl alcohol was employed in 25% excess based on a calculated equivalent weight of 750 for the residue. The reaction mixture was maintained between 200° and 220°C for about 10 hours during which time the theoretical amount of water was removed. A vacuum was then applied to the system and heating continued at 225°C to remove the final traces of water and strip off the unreacted (excess) benzyl alcohol. About 0.5 wt. % Dicalite (a commercially available diatomaceous earth filter aid) was added and the reaction mixture filtered. The final product has an acid value of about 8 and a viscosity of 26.0 centistokes at 180°F.

EXAMPLES III – IV

A series of experiments were conducted in accordance with the process of this invention wherein the distillation residue of Example II was reacted with various polyhydric alcohols. The alcohols employed were neopentyl glycol, trimethylolpropane, trimethylolethane and pentaerythritol. In all these experiments the equivalents ratio of alcohol to residue was 1.0:1.0 and the reaction mixtures were heated (200°–220°C) until the acid value was less than 9. Reaction times ranged from 6 to 10 hours. The following table lists the polyhydric glycol used for each of the preparations, the amount (grams) of the alcohol and the residue charge, and the viscosities and pour points of the resulting products.

| Example No. | III | IV | V | VI |
| --- | --- | --- | --- | --- |
| Alcohol | neopentyl glycol | trimethylol-propane | trimethylol-ethane | pentaerythritol |
| Reactant charge (alcohol/residue) | 64.8/935.2 | 56.3/943.7 | 48/900 | 43.4/956.6 |
| 180°F Viscosity (centistokes) | 118 | 259 | 264 | 489 |
| Pour point (°F) (ASTM D 97-57) | 0° | 20° | 15° | 35° |

All of the above products were filtered with a diatomaceous earth filter aid and were useful lubricants.

The above examples clearly demonstrate that a variety of useful products are obtained by treating residues resulting from the distillation of fatty acids produced by pressure splitting fatty materials. It is truly surprising that waste distillation residues, heretofore, considered to have little or no practical or commercial value, are converted by the process of this invention to products useful as lubricants for continuous casting operations and other metal working applications. That acceptable lubrication can be obtained from these undesirable appearing wastes is by itself truly surprising, however, it is even more remarkable when one considers that the products of the process can be used without further purification.

To demonstrate the effectiveness of the products of this invention as lubricants they were evaluated with a Falex machine. This machine provides a convenient and reliable means of determining the film strength or load carrying properties of materials as extreme pressures are applied. Falex testing is recognized through the industry as a means of measuring the relative effectiveness of various lubricants. For the Falex wear test (ASTM D 2670-67) a 60 gram sample of the product is placed in the cup and positioned in the machine so that the steel pin and blocks are completely immersed in the sample. The loading device is attached, the machine started and the load increased to 350 pounds and run for 5 minutes. After this time the load is further increased to 800 pounds and maintained for 15 minutes. Readings are taken at the beginning and end of the 15 minute period and the difference in the readings reported as the units of wear. The following table sets forth the test results obtained when the products of Examples I–VI were evaluated in the Falex test. In addition to the wear test data, other significant lubricant properties including viscosities of the product at 100°F and 210°F and the flash and fire points are provided.

| | PRODUCT OF EXAMPLES | | | | | |
| --- | --- | --- | --- | --- | --- | --- |
| | I | II | III | IV | V | VI |
| Units of Wear | 20 | 1 | 76 | 49 | 1 | 4 |
| Viscosity | | | | | | |
| 100°F | 129 | 130 | 858 | 2025 | 2170 | 4750 |
| 210°F | 17.3 | 17.5 | 68.5 | 133 | 142 | 263 |
| Flash point (°F) | 510 | 525 | 575 | 575 | 585 | 570 |
| Fire point (°F) | 555 | 550 | 590 | 605 | 600 | 590 |

Refined rapeseed oil and soybean oil gave 46 and 33 units wear, respectively, in the Falex machine under identical test conditions. The product of Example I was also evaluated using a four-ball extreme pressure lubricant tester in accordance with ASTM D 2783. The test was conducted for 1 hour (167°F) at a load of 40kg. and 1200 rpm.

The average wear spot diameter was only 0.70 mm.

EXAMPLE VII

To further demonstrate the versatility of the present process and the ability to obtain useful lubricant products using mixed alcohols an experiment was conducted wherein 407 parts of the residue of Example II, 4.2 parts neopentyl glycol and 88.3 parts 2-ethylhexanol (25% excess) were reacted. Stannous oxalate (0.03%) was used to promote the reaction. After about 14 hours (220°C) an acid value of 3.8 was obtained. At this point the vacuum was further reduced and about 18 parts 2-ethylhexanol stripped from the reaction mixture. The final product (acid value 4.0) was recovered by filtration with a diamomaceous earth filtering agnet. The product had 100°F and 210°F viscosities of 104 centistokes and 14.5 centistokes, respectively, a flash point of 500°F and a fire point of 535°F. In the Falex test, following the procedure set forth above, there was no measurable wear using the product of this Example.

EXAMPLE VIII

That additional advantages are possible employing the process of this invention is evident from the following example wherein a lubricant product, emulsifiable with water without the addition of external emulsifying agents, was prepared from the distillation residue of Example II. To prepare this self-emulsifiable product polyoxyethylene glycol (average molecular weight of 400) and 2-ethylhexanol were reacted with the residue at an equivalent ratio of 0.2:0.8:1.0, respectively. 0.03 Percent condensed butyl titanate was employed to catalyze the reaction which was carried out at 210°–220°C for about 30 hours, until an acid value of 3.4 was obtained. The recovered product had a 100°F viscosity of 118 centistokes, 210°F viscosity of 17.0 centistokes, 315°F smoke point, 495°F flash point and 545°F fire point. In the Falex wear test, there was no measurable wear when the product of this Example was used as the neat oil and only 2 units wear when a 5% aqueous emulsion product was tested. In addition to the excellent wear test properties obtained with the emulsion, the emulsions were quite stable and very readily formed. A 5% aqueous emulsion was also prepared from the product of Example I using ethoxylated nonylphenol as the emulsifier and gave 22 units wear in the Falex test.

EXAMPLE IX

A water soluble lubricant was prepared by reacting the distillation residue of Example II with azelaic acid and a polyoxyethylene glycol having an average molecular weight of 400. The equivalents ratio of the respective materials charged was 0.2:0.8:2.0. The reaction was carried out in the usual manner with heating while removing the water by reaction. After about 20 hours at 210°–220°C 28 mls water were removed and the acid value of the reaction mixture was 5.8. A vacuum was then applied to the system to remove the final traces of water and the heating terminated. The resulting product was cooled and filtered using a dicalite filter aid. The acid value of the final product was 5.3. This lubricant has 100°F and 210°F viscosities of 221 and 28.1, respectively, a flash point of 550°F and fire point of 590°F. In the Falex test the neat oil gave only 4 units wear. A 5% aqueous solution of this lubricant was prepared with cold tap water and when evaluated in the Falex machine showed only 19 units of wear. The aqueous solution was homogenous and did not undergo phase separation.

Repeating the above example but substituting adipic acid for the aselaic acid gave a similarly useful and water-soluble lubricant product which had an acid value of 6.2, flash point of 560°F, fire point of 600°F and a 210°F viscosity of 31.6.

EXAMPLE X – XII

Employing the same equivalents ratio, polyoxyethylene glycol and distillation residue as in Example IX but varying the acid component, a series of water-soluble lubricants were prepared. The composition make-up of the various products is provided in the table below as well as the pertinent properties of the lubricants.

| PRODUCT OF EXAMPLE | X | XI | XII |
|---|---|---|---|
| Weight Percent: | | | |
| Residue | 24.0 | 24.9 | 22.0 |
| Polyoxyethylene glycol | 65.0 | 66.6 | 59.0 |
| Isophthalic acid | 11.0 | — | — |
| Trimellitic anhydride | — | 8.5 | — |
| Pelargonic acid | — | — | 19.0 |
| Acid value | 11.5 | 5.3 | 2.2 |
| 210° Viscosity | 37.6 | 51.1 | 10.6 |
| Flash point (°F) | 570 | 560 | 540 |
| Fire point (°F) | 610 | 590 | 580 |
| Units Wear in Falex Test: | | | |
| Neat Oil | 16 | 1 | 5 |
| 5% Aqueous solution of oil | 20 | 54 | 30 |

EXAMPLE XIII

Following the procedure of Example IX a water-soluble lubricant was prepared by reacting the residue with azelaic acid and a polyoxyethylene glycol of average molecular weight 2000. The final product contained 24 wt. % distillation residue, 12 wt. % azelaic acid and 64 wt. % polyoxyethylene glycol.

EXAMPLE XIV

Similar to Example XIII a lubricant product was obtained by reacting distillation residue, azelaic acid and polyoxyethylene glycol (average molecular weight 1000) at an equivalents ratio of 0.2:0.8:0.8. The product, which has an acid value of 27.7, was readily soluble in cold water to provide a useful aqueous lubricant solution.

The lubricants of this invention which are capable of forming aqueous emulsions or solutions find particular utility in metal working operations where a high degree of cooling is required. The aqueous lubricant formulations preferably contain 0.5 to 25 percent by weight and, more preferably, about 1 to 10 percent lubricant. These aqueous systems may be added to the metal working elements, such as the working rolls, or they may be applied to the metal itself by spraying or immersing the metal in a bath containing the lubricant. The emulsion or solution forms a continuous lubricant film between the working elements and the metal to provide efficient lubrication thereby increasing the output while reducing power consumption and minimizing surface defects.

The aqueous systems containing products of this invention are useful for working both ferrous and nonferrous metals. There may also be present other additives such as stablizers, corrosion inhibitors and the like. The aqueous lubricant systems may be recycled for reuse in considerable economic advantage. Makeup water maybe added to restore the lubricant to its original concentration. It may also be desirable when recycling to strain or filter the material to remove metal, dirt or other particles picked-up during the processing operation. This is particularly true when the aqueous systems are applied using spray nozzles.

We claim:

1. A lubricant obtained by reacting (a) 60 to 90 weight percent polyoxyethylene glycol of molecular weight 100 to 4000, (b) 7 to 18 weight percent carboxylic acid containing from 4 to 15 carbon atoms or the anhydride or $C_1$ - $C_4$ alkyl ester thereof and (c) 3 to 26 weight percent of a residue obtained from the distillation of fatty acids produced in fat-splitting processes; said reaction conducted at a temperature above 100°C while removing water from the reaction mixture.

2. The lubricant of claim 1 which further characterized as being soluble in cold water in all proportions.

3. The lubricant of claim 1 wherein the distillation residue (c) has an iodine value from about 50 to 100, an acid value of between about 50 to 100 and a saponification value between 100 and 200.

4. The lubricant of claim 1 in aqueous solution.

5. The lubricant of claim 1 wherein (a) has a molecular weight from about 400 to 2000, (b) contains from 6 to 10 carbon atoms and the reaction temperature is between 150° and 250°C.

6. The lubricant of claim 1 containing 65 to 80 percent (a), 11 to 15 percent (b) and 5 to 25 percent of a distillation residue (c) having an iodine value from about 50 to 100, an acid value between about 50 and 100 and a saponification value between 100 and 200 are reacted.

7. The lubricant of claim 5 wherein (b) is azelaic acid.

8. The lubricant of claim 6 characterized as having a flash point above 500°C, a fire point greater than 540°C and soluble in cold water in all proportions.

9. The lubricant of claim 6 treated with a diatomaceous earth.

* * * * *